United States Patent [19]

Setliff et al.

[11] 4,428,057
[45] Jan. 24, 1984

[54] ELECTRONIC CHART SYSTEM

[75] Inventors: Jerry Setliff, Dallas; Gerald Burnham; Michael Smith, both of Plano, all of Tex.; Richard D. Hoffman, Kenvil, N.J.

[73] Assignee: Texas Instruments Incorporated, Dallas, Tex.

[21] Appl. No.: 271,917

[22] Filed: Jun. 9, 1981

[51] Int. Cl.³ .............................................. G06F 15/50
[52] U.S. Cl. .................................... 364/521; 364/444; 364/449; 364/452; 340/24; 343/451
[58] Field of Search ............... 364/444, 449, 452, 460, 364/521, 523; 340/24, 27 NA; 343/112 C, 112 PT; 358/261

[56] References Cited

U.S. PATENT DOCUMENTS

| 3,828,319 | 8/1974 | Owen et al. | 358/261 |
|---|---|---|---|
| 3,845,289 | 10/1974 | French | 364/444 |
| 4,034,406 | 7/1977 | Tsuchiya et al. | 358/261 |
| 4,086,632 | 4/1978 | Lions | 364/444 |
| 4,092,676 | 5/1978 | Saran | 358/261 |
| 4,096,526 | 6/1978 | Furuta | 358/261 |
| 4,192,002 | 3/1980 | Draper | 364/449 |
| 4,253,150 | 2/1981 | Scovill | 364/449 |

Primary Examiner—Gary Chin
Attorney, Agent, or Firm—Alva H. Bandy; N. Rhys Merrett; Melvin Sharp

[57] ABSTRACT

An electronic chart system in which charts of the earth are stored in digital representation and communicated to the operator by a visual display. Through the use of a Loran-C receiver or the like, the system additionally plots the carrier's position on the visual representation of the chart. The visual display is a cathode ray tube on which the visual representation is compressed or expanded to meet the demands of the operator so that the appropriate resolution is thereby obtained. To minimize memory size an encoding format is used which provides a data word for indicating the first physical element of the run line, a data word for the number of runs per line and data words for the lengths of N−1 runs of up to two variables for each line of the chart.

8 Claims, 18 Drawing Figures

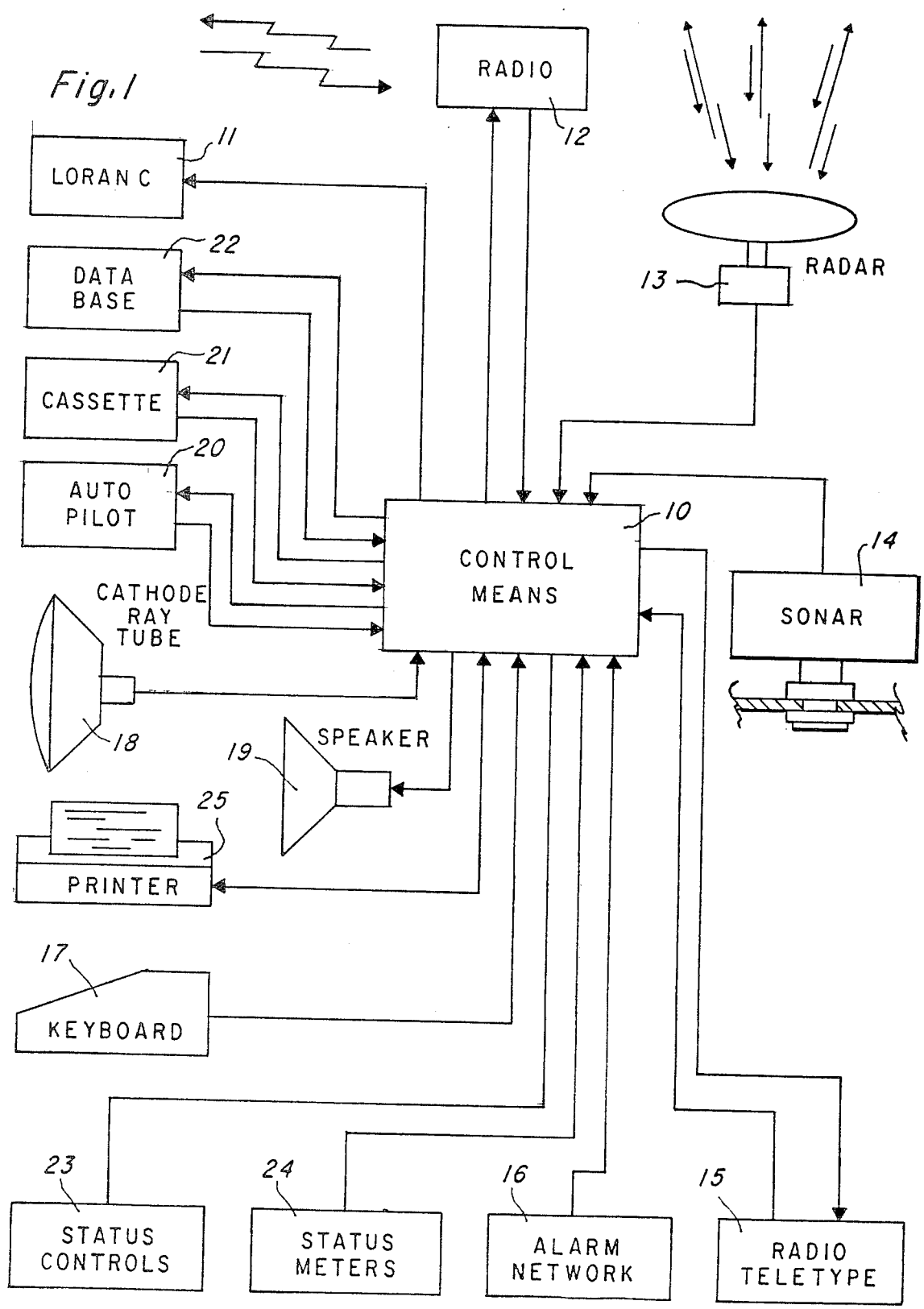

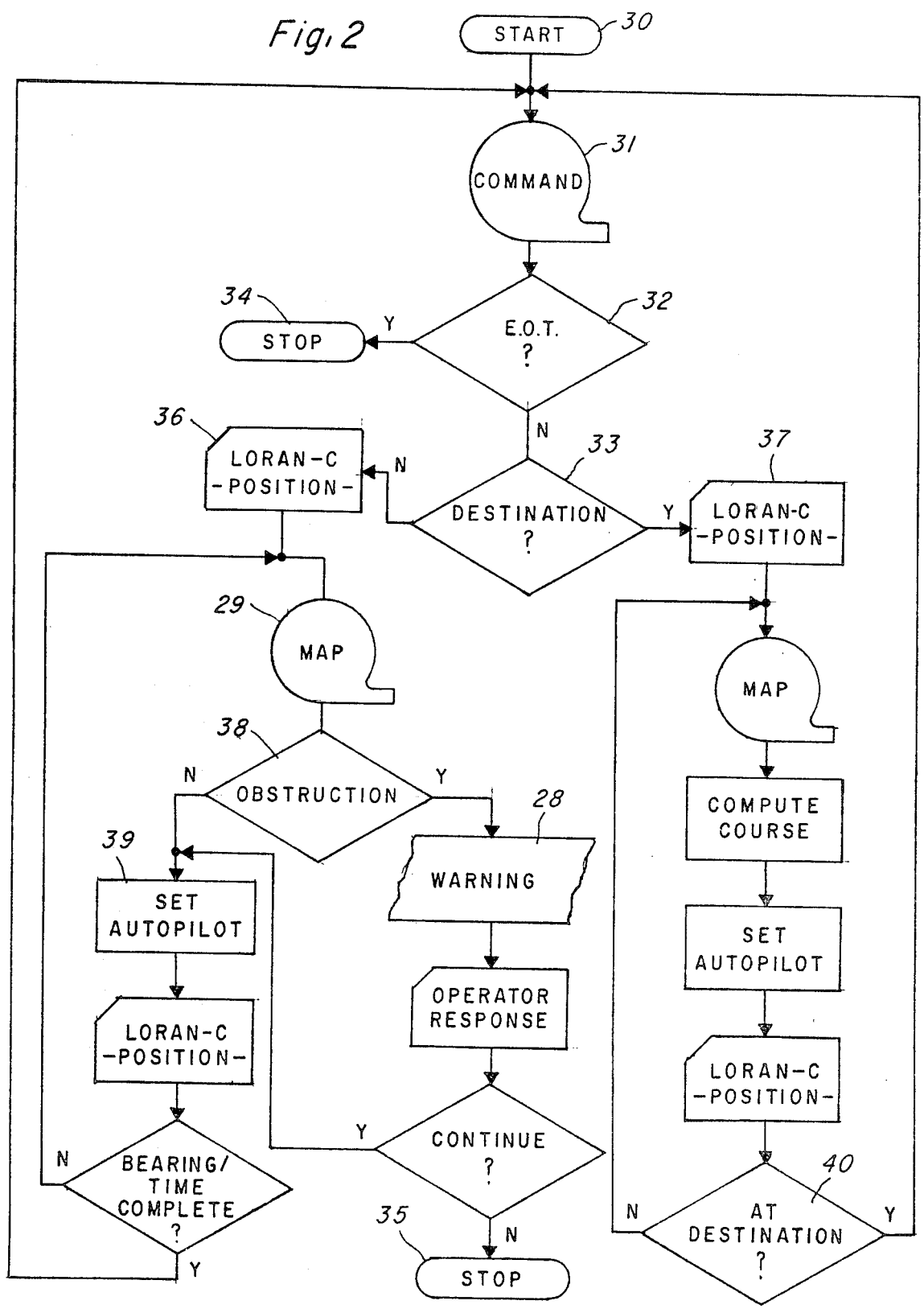

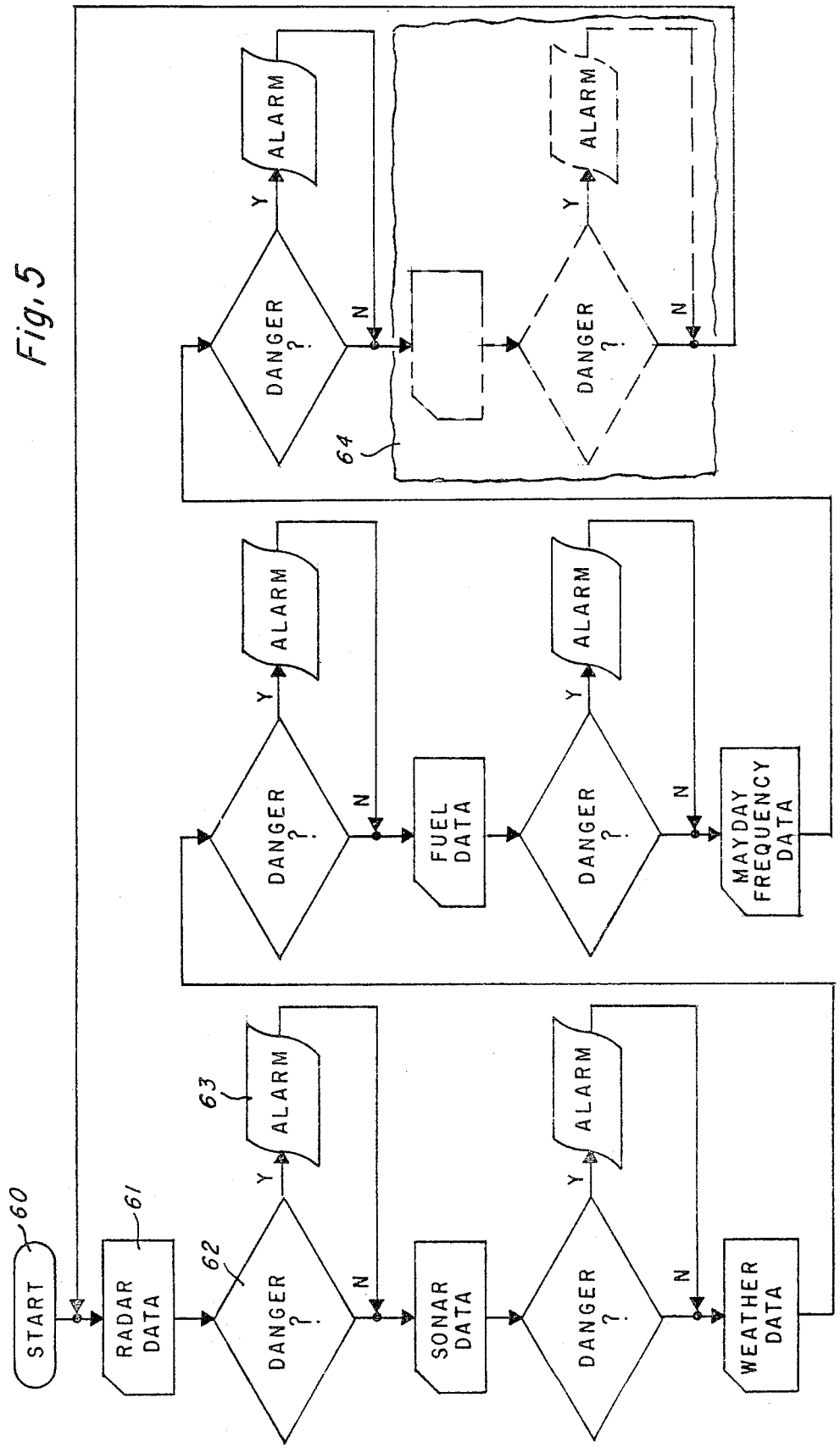

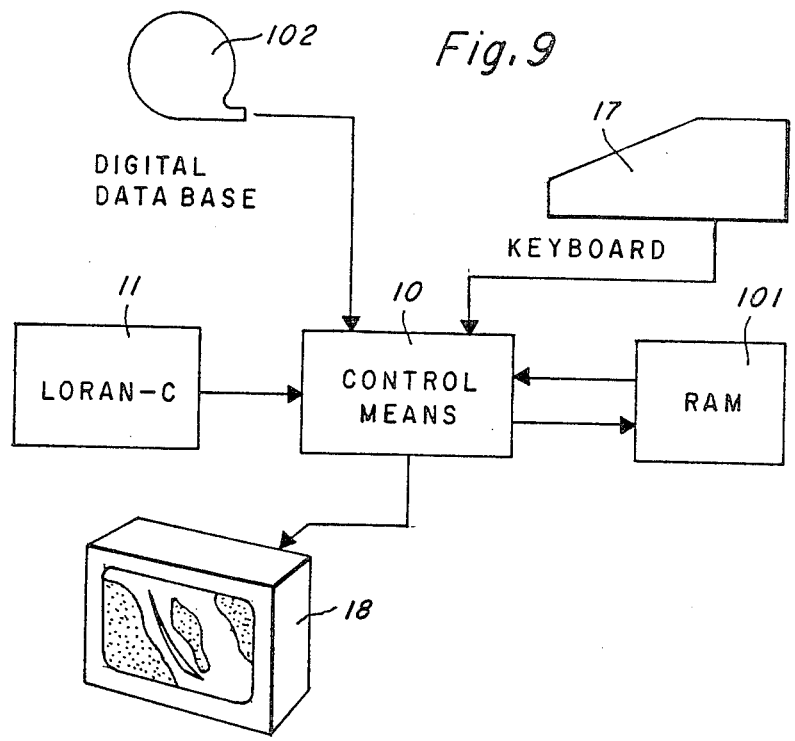
Fig. 9
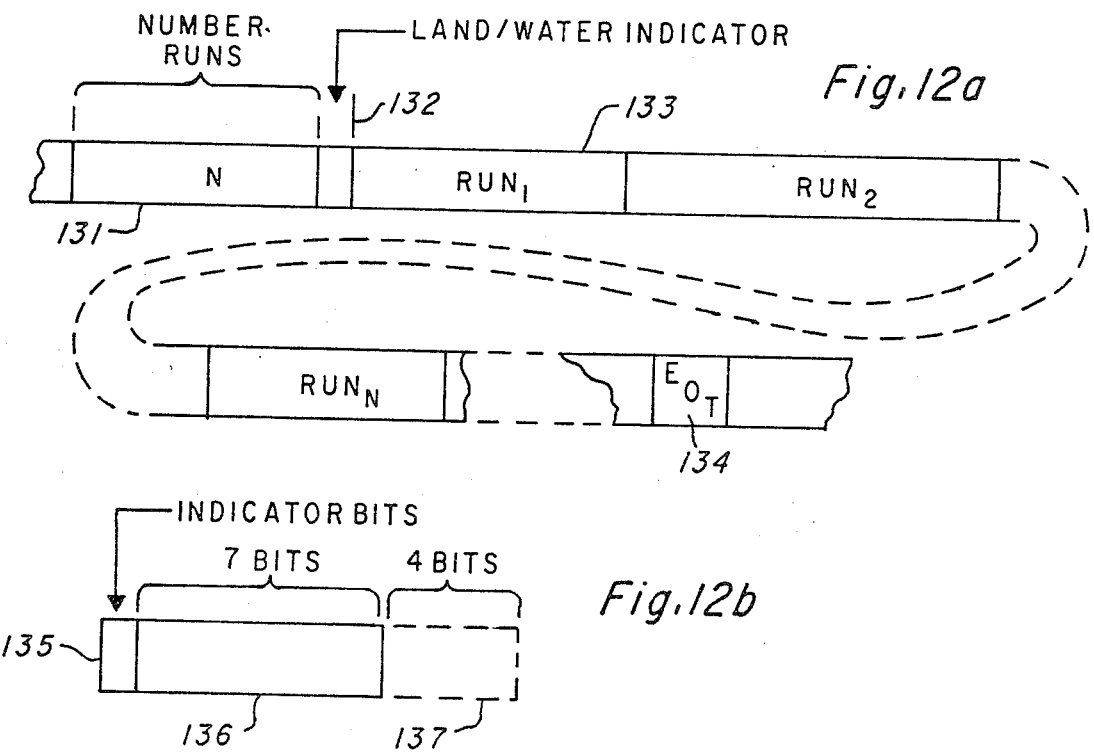
Fig. 12a
Fig. 12b

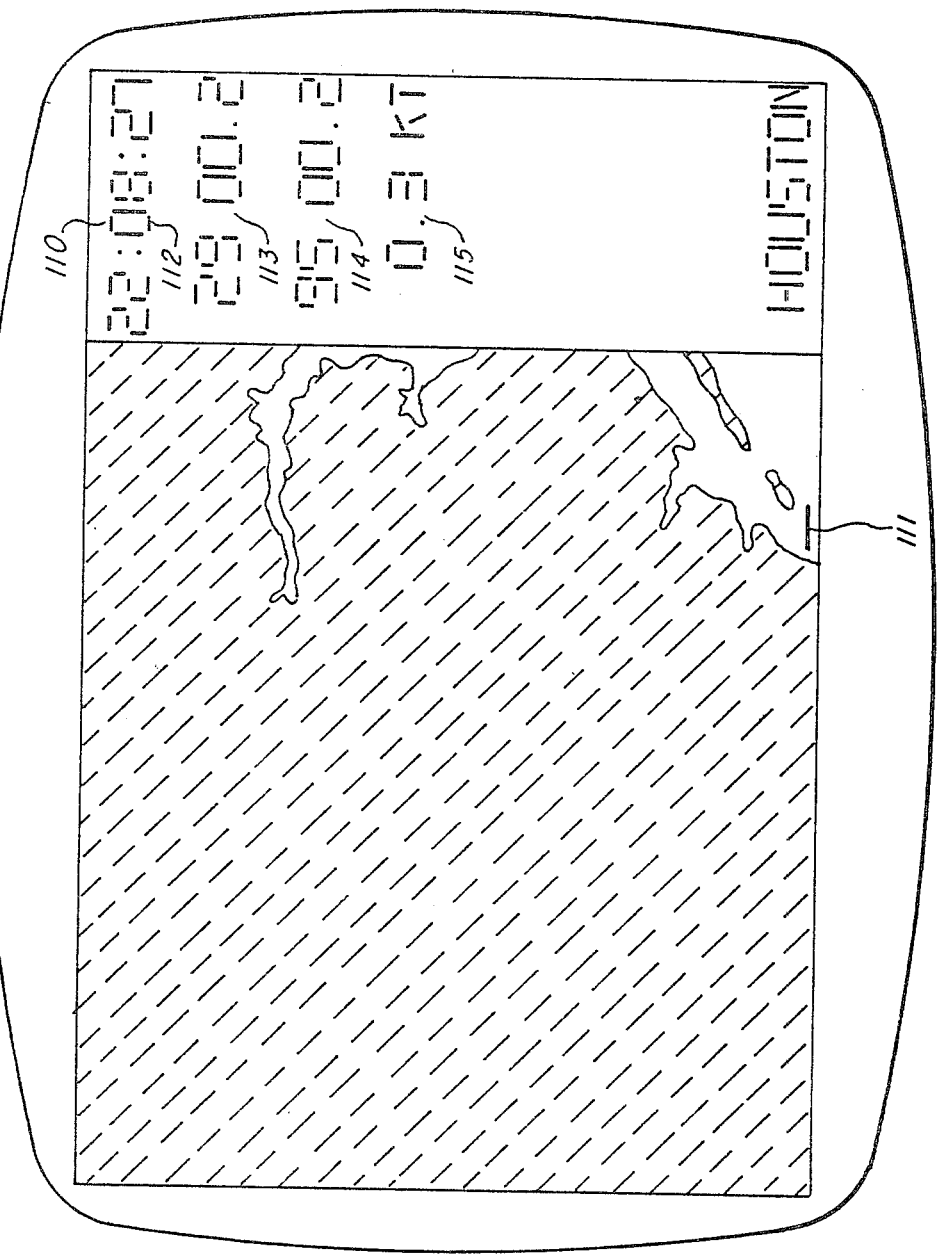

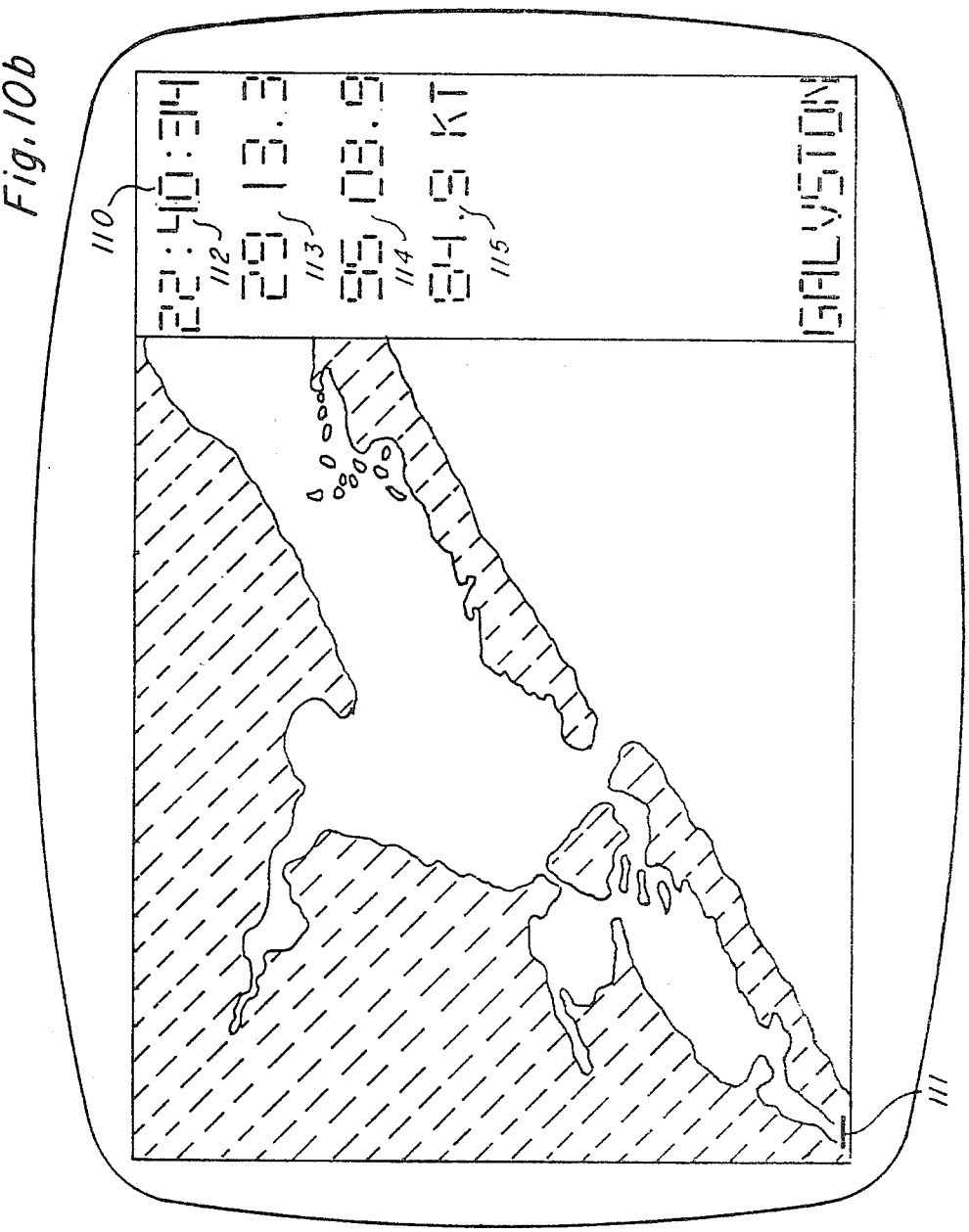

ELECTRONIC CHART SYSTEM

CROSS-REFERENCES TO RELATED APPLICATION

Related copending applications, all of which have the same filing date of June 9, 1981, are: Ser. No. 271,914, entitled "Navigational Aid Auto Pilot", Ser. No. 271,902, entitled "Improved Radar System", Ser. No. 271,918, entitled "Navigation Aid and Method of Operating the Same", and Ser. No. 271,915, entitled "Method and Apparatus for Automatic Distress Call Signal Transmission".

This invention relates to navigational aids and operational aids for utilization in the marine environment.

As the world's waterways become more congested due to the increased volume of trade conducted thereon, the need for operational and navigational aids is heightened. This need is further enhanced by the complexity and size of the vessels being used today. The aids are used to warn of dangerous conditions in the external environment such as other vessels, islands, or weather conditions. Examples of these aids are radar, sonar, and radio transmitters. Additionally, aids exist for assistance in the operation of the vessel, these communicate to the operator various informational data so that the vessel is maintained in proper operating condition. These types of operational aids include knot meters, flow meters, motor speed monitors, and the like.

These instruments are typically independent of each other and perform as stand-alone mechanisms. The data supplied by each instrument is raw and not correlated to the other conditions which are being measured. As example, the radar should be monitored for approaching vessels or land masses; this monitoring requires constant surveillance by the operator.

Nonelectronic apparatus such as, for example, paper charts, clocks and logs are also used in the operation of the vessel. In operation, the pilot needs to obtain these charts and match the data contained therein to the electronic instrument data being communicated. Additionally, as discrete time intervals, typically every four hours, the operator must enter selected data into the logs so that the operation of the craft may be later analyzed.

The number of the instruments and charts kept within the cockpit has created severe space limitations. Many components which are duplicative of the components of other instruments, the combination of such instruments wherever possible can result in cost, space, and power savings.

A greater concern exists in the necessity for the operator to correlate the incoming raw data generated by each individual independent system.

The purpose of this invention is to provide a more efficient use of the operator's time by automatically correlating and monitoring the data.

The numerous active and passive instruments found in a typical cockpit are generally categorized under the following subheadings; although, those skilled in the art recognize that characteristics of one catagory are generally extendable to the other categories. The subheadings are to be used solely for reference and not as limitation.

NAVIGATIONAL AID

As noted earlier, two types of data are of particular importance. This data includes the status of external physical conditions (e.g., weather or position of other vessels) and selected internal physical states of the craft (e.g. motor speed, or autopilot control).

This external physical condition and the internal physical state of the craft is combined on an electronic chart or other such map giving a representation of the surface characteristics of the locale of the craft. The data from these three sources (external conditions, internal state, and chart) is combined to form a single combination or representation which is communicated to the operator or user. As example only, the position of another craft relative to the subject vessel is illustrated on an electronic chart to give their relative positions; this is correlated together with the data from the internal state as to the speed of the vessel to cross check if a collision will occur.

Hence, the representation showing the relative positions of all the crafts, together with their speed efficiently communicates to the operator in a single visual representation the situation without the need for operator interpolation or cross referencing the data from each source. The data of this invention far exceeds the informational content of the sum of its parts since the three independent data by and of themselves cannot communicate the situation without operator correlation.

A position determining means (such as a Loran-C) together with the data storage means (magnetic tape cassette) are combined with an autopilot type device. This allows the craft to be completely piloted merely by insertion of the magnetic tape. A control means, such as a microprocessor, correlates the position to the instructions on the cassette and makes the appropriate course changes.

The control means accepts either data which is descriptive of a chosen bearing, speed, and chosen duration, (i.e., a bearing of 350° for a time of two hours fourteen minutes at a speed of ten knots; alternatively the descripter is data defining the absolute position of the chose destination (i.e. 24°, 14′, 81°, 24′, 19″). In the latter situation, the control means computes a bearing necessary to reach the destination and then appropriately directs the autopilot to obtain this bearing. By monitoring the position determining means, the control means is aware of the progress and any changes which must be made are determinable.

By adding the position determining means to the electronic chart, the control means additionally determines the components of a multi-leg course so as to avoid non-navigatable area, such as an island and displays the course on the electronic chart.

RADAR SYSTEM

The invention is further enhanced through manipulation of radar data so that it is in a form and characterized with other data so as to facilitate operator analysis.

To this end, a radar apparatus with a visual display means is connected to the control means. The control means accepts the data from the radar apparatus and transforms it according to the operator demands. The transformed data is communicated to the operator via the visual display means.

The operator's demands permit the center of transmission or datum to be artificially moved anywhere on or off the visual display. This provides a movable window so as to highlight and/or give higher resolution to a particular zone of interest. Additionally, the magnification of the visual representation is enhancable so as to aid in the operator analysis of the zone of interest.

This artificial movement of the datum point or the enhancement capability is achievable since the radar soundings generate a significantly higher resolution than is typically displayable on a standard cathode ray tube. This sounding resolution is averaged out in normal operation; but is capitalized upon in movement of the window.

In this context, the control means accepts the electronic data from the radar apparatus, and magnifies or reduces the displayed visual representation as per the selected data relating thereto from the operator. The center or datum of the transmission is selectively movable to any point thereby providing a higher resolution, or to accentuate an area of interest.

The operator is permitted to label particular points of interest on the radar representation. The control means tracks this point and constantly updates the displayed label; this attribute permits ready marking of points or objects of interest such as a sister ship.

SUMMARY OF THE INVENTION

ELECTRONIC CHART

The electronic chart system is digital in nature so as to facilitate matching of data from instruments or chart. An analog chart is particular unsusceptible to automation for enlargement, storage, or display on a cathode ray tube (CRT). For this reason, a memory means containing a digital representation of the area of interest, whether it be the area in the locale of the craft or an area which is to be encountered by the craft, is connectable to the control means so that the chart, as per command of the operator, is displayable on a volatile display such as a CRT.

The electronic chart must be sufficient to define the particular characteristics which are of interest and which the craft is likely to encounter. As example, these characteristics for a marine vessel would include water ways, islands or other, land masses.

The actual resolution of the electronic map is operator manipulated so to achieve the appropriate resolution according to the operator's whim. This allows particular areas, such as a port area, to be enlarged to allow expanded scrutiny.

One aspect of the electronic chart is its storage on a detachable nonvolatile storage means such as a magnetic tape. The detachable feature allows an extensive library to be carried. This is particularly useful for vessels which have extended trade routes. The detachable memory means are such mechanisms as magnetic tape cassettes, disks, or bubble memory.

The chart must be efficiently encoded so as to allow the most fruitful use of the memory means. The method of this invention is to divide the chart into a finite number of parallel scan levels; each of these scan levels is then encoded to indicate the changes in condition encountered within the particular scan level.

For marine purposes, two characteristics are to be defined by the chart; that is, whether a particular point within the chart is water or is land. An indication is made as to whether the scan level's origin is either land or water (i.e., "0" for land, "1" for water). The number of changes from water to land or vice-versa is then recorded. This data defines the number of "runs" or lengths within land exclusively or water exclusively. Each run is further defined by a subsequent encoding as to the length of each ray. In this manner, the electronic chart is properly encoded to encompass a minimum number of storage areas and yet completely define the map.

Although the above example speaks in terms of land and water, it is intended that the method may be extendable to any other two conditions such as, but not limited to, changes in elevation, or international boundaries.

CONTROL MEANS

The use of the electronic chart together with the position determining means, such as a Loran-C receiver, permits the two sets of data to be cross-referenced by the control means to indicate on the electronic chart the absolute position of the craft. In this fashion, the operator, at a glance, is able to ascertain whether the craft's bearing or position, in relation to the surroundings, should be altered to avoid obstacles such as islands.

The control means is combined with the position determining means, an electronic speech synthesis means, and a radio transmitter to create an automatic distress call apparatus. The automatic distress cell apparatus allows an auditory Mayday message to be created which incorporates the actual position of the sinking craft and then transmit while the craft sinks. The control means obtains the position of the craft and creates a "Mayday" message or signal which is communicated via the electronic speech synthesis to the radio transmission means for transmission over the appropriate frequency for mayday messages.

The apparatus is preferably enhanced by the addition of a means to monitor if the first or primary frequency used for "Mayday" messages is clear at the time of contemplated transmission. Should the channel not be clear, that is being used by another party, the apparatus transfers to a second selected frequency and transmits on that frequency until the first or primary frequency is clear; at that time the apparatus returns to the primary frequency and continues transmitting.

Preferably the control means has a means for determining the closest land based radio station or other appropriate receiver and utilizes this data to determine the preferable language in which the mayday message is to be transmitted. The control means transmits the "Mayday" message in that langauge or any other language which has a probability of being received and therefore understood by a possible rescuer.

This apparatus allows the transmission to be triggered either by an operator or automatically by severe change of state (i.e., fire), and to continue transmission to the very last possible moment or until deactivated by the operator. The transmission contains, in the relevant language, the absolute position of the craft in distress together with the crafts call letters or any other information which would facilitate obtaining help.

CONTROL MEANS

The integration of the various instruments and devices into a single system, accomplished a control means acting as the center of the system. The control means receives and transmits information from the various sensors and instruments so as to correlate the total amount of data and thereby form a single communication to the operator.

The data received from such devices as the radar or Loran-C receiver is matched to the appropriate vessel internal physical state sensors, such as the flow meters or fathometer, so that their data, when matched together by the control means, provide a single message having informational content higher than the sum of their parts.

As example, the control means accepts data from its radar device indicating the presence or absence of various obstacles and land masses; this data is plotted onto the electronic map which is stored on a magnetic tape cassette. The two sets of data are represented in one single combination on the cathode ray tube or other such visual display means. Additionally, the control means matches data from the knot meter indicating an internal physical state and the radar data to determine if a collision is imminent and if an evasive movement should be made.

Although the above example refers to the use of a radar unit as a means for measuring external physical condition, a knot meter as a means for measuring the selected internal physical state of the craft, and a magnetic tape cassette as a means for storing a representation of the surface characteristics of the surface of the earth and a control means for correlation, it is clear that these devices may be altered at the will of the designer and user, allowing the overall system to take on any of the characteristics or functionality which is desired for the particular situation.

In this context the means for measuring the external physical condition may be such devices as a radio teletype, a sonar device, a single side band radio, a Loran-C, or the like. The means for measuring selected internal physical state of the craft includes such devices as a digital compass, flow meters, volume meters, and the like.

The control means will be any of numerous devices such as a TMS 9900 or other such processor capable combining the data sets for other data processors see U.S. Pat. No. 3,757,308 issued to Fosdick on Sept. 4, 1973, or U.S. Pat. No. 3,787,673 issued to Watson et al on Jan. 22, 1974, both of which are incorporated herein by reference.

The control means communicates to the operator via an operator interface. The operator interface takes on many forms and preferably includes a Cathode Ray Tube (CRT) as its principal means for displaying information. A keyboard is additionally added so as to permit the operator to selectively input data and commands which the control means utilizes. The encoding of the keyboard take on various forms including that of the U.S. Pat. No. 3,643,254 issued to Proebsting on Feb. 15, 1972, incorporated herein by reference.

Certain commands and data must be entered by the operator for the control means to operate. An example of this data is the desired bearing and speed of the vessel, or which selected combinations of data are desired to be displayed.

In the preferred embodiment of the invention the operator interface is coupled to a means for speech synthesis so that any prompting or data which is communicated to the operator is additionally via an auditory channel so as to relieve the operator of the need to maintain constant visual monitoring of the CRT to obtain his information. This permits the operator to move throughout the cockpit or in the near vicinity and still be cognizant of the data which is being generated by the control means. This auditory communication ability is particularly valuable for sounding alarms or warnings.

One such speech synthesis means is U.S. Pat. No. 4,209,836 issued to Wiggins, Jr. et al on June 24, 1980, incorporated herein by reference.

The control means also receives and gives instructions to the automatic pilot, whether they be data or commands. The instruction come, from a storage means such as a Random Access Memory (RAM), a Read Only Memory (ROM), a magnetic tape machine or the like, or as a result of computation. One example is the storage system disclosed by U.S. Pat. No. 4,099,259 issued to Parsons et al on July 4, 1978, incorporated herein by reference.

The control means utilizes the data from the storage means to perform its autopilot task. Two types of data are preferably used in this context.

The first type of data indicates a direction or the bearing desired. The control means accepts the bearing data and correlates it to the digital compass in directing the operation of the autopilot.

The second type of data which is storable is a destination location. This destination may be described by its longitude or latitude or other such acceptable means. The control means utilizes this data together with the electronic chart in establishing a feasible course between the point of origin and the point of destination possibly with operator assist. Multiple legs may have to be computed by the control means in its navigation of the craft.

In the preferred mode, the storage means is a magnetic tape cassette.

In navigating the ship from the point of origin to the point of destination, the ship's progress is monitored through the use of a position determining means. The location as indicated by the position determining means is matched to the electronic chart or map so as to maintain the control means cognizance of the position of the ship and its designated course. In this fashion, as the craft is pushed or wanders off course due to foul weather or simply to a drift, the control means automatically adjusts its course so that the appropriate destination is still achieved.

Some such position determining means are disclosed in U.S. Pat. No. 3,875,751 issued to Davis Jr. et al on April 1, 1975, U.S. Pat. No. 3,630,079 issued to Hughes et al on Dec. 28, 1971, or U.S. Pat. No. 4,134,117 issued to Robinson et al on Jan. 9, 1979, all of which are incorporated herein by reference. The preferable position determining means is that of a Loran-C similar to the device described in United States Patent issued to Robinson et al described above.

In the operation of the autopilot the digital nature of the control means at various times is translated into a representative analog form so as to control such things as the rudder or other continuous operation type devices. One digital-to-analog (D/A) converter is disclosed in U.S. Pat. No. 4,142,245 issued to Baron on Feb. 27, 1979, incorporated herein by reference. Numerous devices also exist which will translate the analog position into a digital representation so that the control means is able to monitor its operation through feedback. These devices are typically referred to as analog-to-digital (A/D) converters which are well known in the art.

Numerous peripheral operations are preferably monitored by the control means so as to relieve the operator of the odious burden of checking relatively stable conditions, but which must be kept track of during the vessels operation. These types of operations include the fuel level indicator, or revolutions per minutes (RPM) of the motors. One such device which will measure the liquid level is disclosed in U.S. Pat. No. 3,148,542 issued to Clift Jr. on Sept. 15, 1964, incorporated herein by reference. A fluid flow sensor is described by the U.S. patent application, Ser. No. 124,419 filed Feb. 25, 1980 by Durham et al entitled "Method of Automated Fluid Flow Measurement with Silicon Sensor", now U.S. Pat. No. 4,319,483, issued Mar. 16, 1982, which is incorporated herein by reference.

It is clear that other devices and mechanisms are available which will measure selected conditions or states within the vessel itself and which need to be monitored for the proper operation of the vessel.

The control means may also receive weather data from an outside source via its radio telephone and utilize this data to map a weather frontal zone or other weather condition on the electronic chart being displayed to the operator. In this example, the operator is appraised, at a single glance, of the position of the craft, its speed and course relative to the surrounding land masses, weather fronts, ships, and the like.

Each individual vessel has its own specific needs which are satisfiable by this invention. As example, a super tanker needs to monitor the level of combustible gases within its hold whereas a pleasure craft does not have this need to as high of a degree. All of these monitors are addable to the invention so as to make an overall system which is specifically tailored to the craft. Alarms and other means for appraising the operator of the status of the craft are particularly susceptible to being incorporated into this system. As noted earlier the control means acts as a central clearing house for the data and its correlation to the other devices prior to its communication to the operator.

RADAR

In addition a control means which is capable of manipulating and correlating data is particularly important for the radar system. The data from the radar is accepted by the control means and magnified and manipulated in any way in which the operator requests. This manipulation or magnification is possible since the information is stored in digital form which is compatible with the control means.

One operation of the digital radar data, which is capitalized upon by the control means, is the moving of the center or datum of the radar. The datum may even lie off the vision of the screen. Since the area in front of the vessel is typically of more concern than the area to the rear of the vessel the center of the screen, which represents the position of the ship, may be moved to the lower portion of the display permitting higher resolution of the range of vision forward of the vessel.

To exemplify this advantage, assume a typical nine inch screen allows a vision of one mile by the radar unit. If the datum point be positioned at the physical center of the CRT, four inches (half of the CRT screen) maps into one mile (4 inches = 1 mile); whereas, should the datum point be positioned at the bottom of the CRT screen, the entire screen may be utilized to represent the same one mile (8 inches = 1 mile). This improves the resolution and also allows a greater vision than normally is encountered.

Additionally, the digital data from the radar device is matched to operator input so as to allow the control means to keep cognizance of the particular digit or point. As example, a particular blip or data digit which represents a sister ship is therefore labeled on the screen so that the operator, at a glance, is kept abreast of its relative location in position.

The center of the screen need not be centered laterally but is optionally right or left juxtaposed so that a particular shore line may be effectively monitored. Hence, should the vessel be traveling with the shore line on its port bow, the center of the screen is right justopposed allowing the shore line on the left to be effectively heightened through resolution.

The center of the screen is movable completely off the screen itself allowing a particular zone of interest to be magnified to any extent which the operator desires. The operator need only indicate the area of interest and the magnification desired to have the associated resolution obtained for the area in question.

One such device which is appropriate in this context is U.S. Pat. No. 3,953,849 issued to Couvillon on Apr. 27, 1976, incorporated hereinto by reference.

As discussed before, an electronic chart is used to digitally represent the two characteristics of the face of the earth. In the marine environment these characteristics would be the shore line defining the land to water relationship. A shallow to deep water lines and or navigational aids are shown.

The digital representation is stored on some memory means such as a ROM, bubble memory, or a magnetic tape device such as a cassette. A volatile display such as a CRT is utilized to display and hence communicate the contents of the digital representation to the operator. The volatile display is controlled by the control means which effectively alters or changes the resolution or magnification of the map as per the instructions of the operator.

The memory means is preferably detachable from the control means. The detachable feature permits the vessel to carry numerous charts so that a library is available for future use. This feature also permits the addition of a map of a new area for the vessel.

Since the CRT is preferably small in size so as to accommodate the confines of the cockpit, an entire chart is not shown with a proper resolution which a typical chart is able to obtain. In operation, the control means accepts the digital data and manipulates it to obtain the proper magnification or resolution desired by the operator; the resultant is displayed on the CRT. The common paper chart is utilized to define the basic size of the electronic chart since it correlates and matches the custom and usage of the marine environment.

To encode the analog paper chart into a digital chart of the preferred embodiment, the paper chart is divided into 1,536 lines and columns representative of the resolution of a Cathode Ray Tube. Each column or alternatively each roll will act as a scan level which is subsequently encoded. The value 1,536 is the preferred number although in practice any number may be used.

The encoding of the scan level capitalizes on the dual characteristics as defined and encountered in the marine environment. That is, two characteristics are important to the electronic chart, the land to water or shore line. The encoding of the scan level involves establishing a first indicator signifying whether the origin of the scan level, preferably the left-justified position on the scan level on a row scan level, is either land or water. The next selected number of bits indicate the actual number of transitions or shore lines encountered in the scan level; as example, should the scan level cross land/water or water/land situations three times, the next bits stored indicate the number three. The distance between land/water boundaries is defined as a run. The length of the run is stored subsequent to the number of crossings indicated in the memory means. One important aspect to note is that the final run need not be defined as to its length. Since its length must be the complement of 1,536 (the number of columns) and the summation of the total runs to that point. This reduction helps to reduce the overall complexity and length within the memory means required to define a particular scan level.

Each scan level is consecutively encoded on the memory means so as to be retrievable by the control means. At the end of the last scan level an end-of-tape or other appropriate means for marking is placed so as to indicate to the control means that the entire chart has been defined.

The control means utilizes the memory means data to define the electronic chart. The operator is able to define the resolution desired or to have a particular section of the chart be displayed. By moving the cursor or other indicating means to a particular spot and indicating the magnification desired at that point, the surrounding locale at the desired magnification is displayed on the CRT.

So as to reduce the amount of working memory necessary within the control means, upon each selective magnification or movement of the cursor to a new locale within the overall chart, the entire memory means containing the digital map is re-read and re-computed to obtain the appropriate resolution and center. The center or datum together with the magnification absolutely defines the chart to be displayed. This re-reading and display is estimated to take approximately two to three minutes. This reduced speed though is not critical in the marine operation though since the analysis of a chart by the operator is typically done well in advance of its actual use. The user is capable of selecting a next chart in advance of its use so that upon demand it is quickly available.

The magnification of the electronic chart utilizes several methods for obtaining the desired resolution. The preferred method is an averaging of the surrounding points so as to obtain the best guess as to whether that particular point at that particular resolution is either water or land in its nature. An alternative method is to skip or to omit the appropriate particular rows or particular columns in defining the land water relationship.

Although a marine environment is used to describe this particular situation, that is a land/water relationship, it is obvious to those skilled in the art that any other two characteristics may be chosen and may be utilized in this electronic chart without losing the scope or spirit of the invention.

With the aid of the electronic chart in digital form, a microprocessor or other control means is capable of utilizing it to better facilitate the operator's efficiency. The chart's information is in proper form for combination with other digital data so as to create a highly informative resultant.

The electronic chart's display is heightened through the addition of a position determining means such as a Loran-C or the like, coupled to the control means. This position is correlated to the electronic chart so that the position relative to the surrounding is communicated in the proper location on the chart. The operator is therefor able to ascertain the nearest land mass or other vessels in his path or the appropriate action to take to enter a harbor.

The vessel's position relative to rivers, lakes, islands is instantaneously ascertainable. This alleviates the need for the operator to obtain the absolute position from the Loran-C receiver or other position determining means and to physically match it to a paper chart. The physical conditions surrounding the craft is the dynamic aspect so as to create a display having greatly enhanced operator aid capability.

The control means is in communication with the position determining means so that the absolute position on the earth of the vessel is constantly known. Should an emergency situation exist, the control means obtains the absolute position of the vessel and uses this position to determine the nearest land based receiver which is capable of receiving a "Mayday" or distress call signal. The control means also selects the native language spoken by the personnel manning the receiver. Through the use of the voice synthesis means as described earlier, the control means formulates a "Mayday" signal and message which incorporates important data relative to the emergency call, including but not limited to the position of the craft. The message may additionally include such information as the class identification, type of distress, crew members involved, and any other relative information which will help in the rescuers attempts. The "Mayday" message from the voice synthesis means is communicated on the primary emergency channel as defined by the governmental entities such as the Federal Communications Commission (FCC).

The transmission of the distress call signal is typically via a single side band radio such as defined in U.S. Pat. No. 3,195,073 issued to Penn on July 13, 1965, incorporated hereinto by reference.

Although the frequency chosen by the FCC or other governmental entity is characteristically kept clear, that is, devoid of nonemergency transmission, sometimes a transmission is being carried over that frequency so as to interrupt a possible distress call signal. In this situation the control means determines that the not-clear condition exists on the frequency and automatically changes to a second or possibly a third chosen frequency for transmission. The key objective being to transmit the "Mayday" signal on the highest probably monitored frequency. Once the primary or more probably frequency becomes clear, the control means automatically changes back to that frequency for transmission of the distress signal.

So as not to dominate a particular radio channel, a controller terminates the transmission after some amount of time. This keeps a channel from becoming inoperative due to saturation.

The language of the "Mayday" message may be transferred from one language to another language depending upon the language's probability of being intercepted as the "Mayday" signal. Particular areas of the earth have a predominate language spoken therein. This predominate language depends upon the water travel and the location of land masses; as example, should the vessel be in distress off the coast of Brazil, the "Mayday" message would be transmitted primarily in Portuquese and possibly secondarily in Spanish. As many languages as are encountered are correlated to their probabilities of being heard and the "Mayday" message is transmitted in any or all the languages which are of interest.

This device then creates a "Mayday" signal which is highly accurate and capable of communication in the human language or alternatively, if desired in Morse code. The message is communicable to any number of people and not limited to a single language or form. Since the "Mayday" message is an auditory language signal, any receiver understanding the language being transmitted is capable of understanding and ascertaining the necessary facts of the "Mayday" message.

BRIEF DESCRIPTION OF THE DRAWINGS

FIG. 1 is a functional block diagram of an embodiment of the overall invention.

FIG. 2 is a flow chart of the autopilot operation.

FIG. 5 is a flow chart of the dangerous condition monitoring aspect of the invention.

FIG. 9 is a functional block diagram illustrating the interplay for the electronic chart with position determining means.

FIGS. 10a and 10b illustrate pictorially the electronic chart with its enlargement capabilities.

FIGS. 12a and 12b illustrate the encoding organization on a memory means.

DESCRIPTION OF THE PREFERRED EMBODIMENT

Figure 3A:
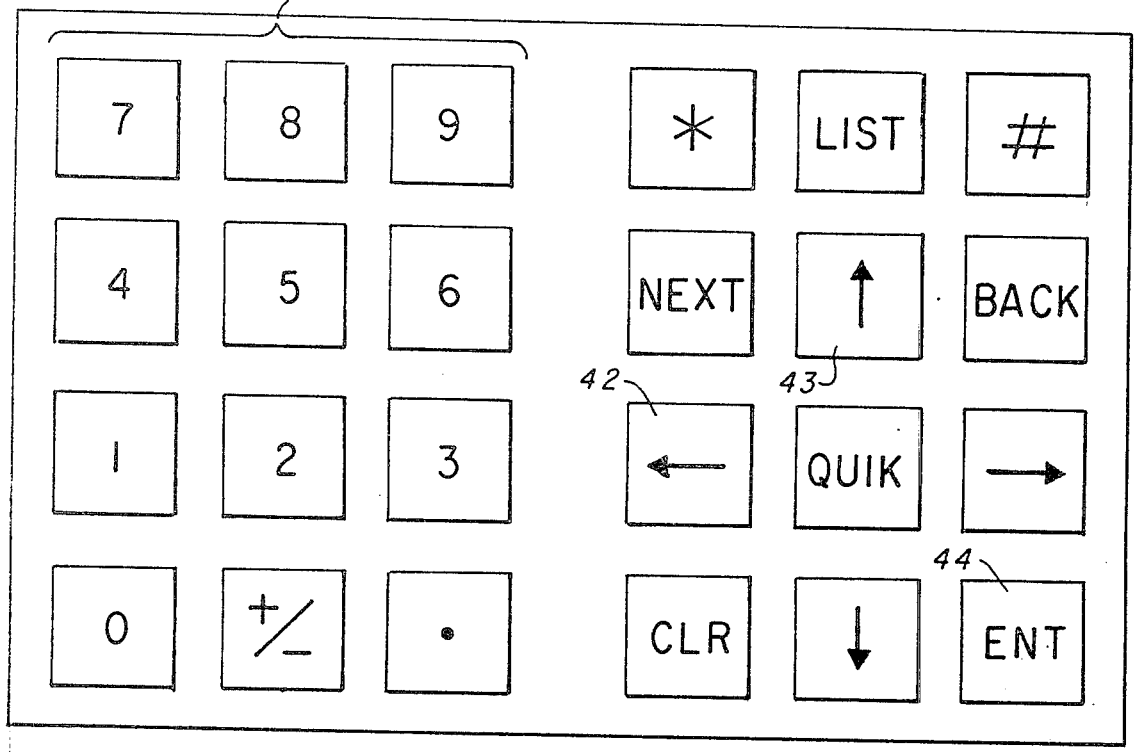
FIG. 3a is a diagram of an operator interface keyboard.

FIG. 1 is a functional block diagram of an embodiment of the invention illustrating the integration into a system. The data from the various peripheral devices is screened and manipulated by the control means prior to its display or utilization.

The control means 10 may be such apparatus as the Texas Instruments Incorporated, TMS 9900. Data from peripheral units is communicated to the control means 10 which sifts this data and correlates it so that it may be combined into a single intelligible form for communication to the operator via the CRT 18, printer 25 or the speaker 19. The dual channels of visual and auditory communication to the operator permits the operator to either visually comprehend the data via the CRT 18 or printer 25, or to audibly monitor the incoming data via the speaker 19. Certain types of data are more susceptible to a visual display than to an audible communication and vice-versa. This combination of voice synthesis together with a visual display provides the invention with a range of operation to fully capitalize on the operator's ability.

The control means 10 accepts data from such devices as the Loran-C 11, the radio 12, the radar device 13, sonar device 14, a radio teletype 15, alarm network 16, the autopilot 20, a magnetic tape cassette 21, or a data base 22. Additionally, status meters 24 and their status controllers 23 are addable to the system to further tailor the invention to the particular needs of the vessel.

As example of this interplay of data, the data from the Loran-C 11 absolutely establishes the position of the vessel on the surface. This information is combined with the electronic chart which is stored in the data base 22 which is, for example, a cassette cassette 22. The combination of these two data sources provides a visual representation on the CRT 18 of the absolute position of the vessel being dynamic in time. The display on the CRT 18 is further enhanced by the data received from the radar device 13 which indicates other dynamic data such as the relative positions of other craft. To further add to the amount of data communicated to the operator the radio 12 receives digital information as to weather conditions so as to place them in their relative position on the electronic map also being displayed to the operator.

The control means additionally monitors certain conditions on and off the vessel so as to make sure that a danger situation does not develop. These devices which the control means 10 monitors include the sonar 14, and an alarm network 16 which will indicate a dangerous condition. As example, the alarm network 16 may check the presence for combustible gases within the hold of the vessel. The control means additionally monitors the radio teletype 15 for any transmission occuring thereon either on the emergency channel or for receipt of incoming messages.

As noted by the status meters 24 and the status controllers 23 the system is expandable to meet the particular needs of the vessel in question. Other instruments are combinable to the control means so as to enlarge the particular attributes of the invention.

The keyboard 17 permits the operator to input data should one of the devices be inoperative or to supply information such as the identification of a particular radar blip as being a sister ship. A control means utilizes this information to keep track of the sister ship.

In this context, the use of keyboard 17 allows input should an apparatus such as the Loran-C become inoperable; the operator takes a visual sighting and input this data so that the controller means 10 has sufficient data for its operation.

Keyboard 17 also allows the operator to enter commands or operation selection into the control means 10. This permits the functionality of the invention to be selectively altered.

The control means 10 furthermore senses if a power-down situation or emergency situation is occuring and print any necessary information for future reference via the printer 24. This feature provides a fail safe situation so that the operator is not left without any reference material should the system fail.

Periodic reports are also made by the control means 10 via the printer 24 for the operator's use so as to allow a paper copy update of the process. The cassette 21 also receives the data as to the automatic operations log which contains such information as the absolute position of the vessel (as reported by the Loran-C receiver 11) any messages received by the radio 12, along with the comments of the operator as communicated via the keyboard 17.

In this fashion, an integrated system is created so that the elements thereof interplay one with the other in their production of a combined informational data to the operator so as to heighten the operator's efficiency and overall performance. The system is additionally tailorable to the specific needs of the vessel and its operation is alterable via a program or the like which is inputted to the control means.

FIG. 2 is a flow chart of the autopilot operation of the invention.

The program is started at 30 where it receives the initial command 31. The command 31 is checked to see if it is an end-of-tape (EOT) 32; in which case the program stops 34.

As noted earlier, the data from the command 31 may have two forms (1) an absolute destination or (2) a bearing, speed and time data. The data is checked for a destination 33. If it is destination, the Loran-C position 36 of the vessel is computed; the position relative to the map is analyzed; the proper computation for the course is made; the autopilot is appropriately set; and the Loran-C position is again monitored; and the position is checked to the destination to see if the vessel has reached its destination 40. This loop is repeated until the vessel reaches destination at which time the next command is obtained 31.

Should the information not be the destination information 33; but, instead contain the bearing, speed, and time lapse, the absolute position of the vessel 36 is determined by the Loran-C in which it is checked as to the map stored in the cassette 29. The two combinations of data (the position compared to the bearing, speed and time lapse) together with the electronic chart, determines if an obstruction lies in the vessels course 38. Should an obstruction exist in the vessels path 38, a warning 28 is issued to the operator at which time the operator has the option to override the cassette bearing and stop the autopilot 35 or alter it as to his command. Should the operator decide to continue on the designated bearing the control means 10 will ignore the obstruction situation and set the autopilot 39. The Loran-C provides data as to the absolute position of the craft and the control means continues in that bearing until the bearing and time has elapsed so as to complete the command. Once complete the control means returns to retrieve another command 31.

In this fashion, either a single or a sequence of instructions as to bearing, time, and course or absolute destinations is delivered to the control means which utilizes them in the operation of the craft. This alleviates the need for a navigator the tedious task of plotting the course and to constantly monitor its progress. Additionally, a particularly fruitful course, such as one which produces a large load of fish, is repeatable ad infinitum, through the use of the cassette to indicate the points of destination or bearing and time which is desired by the operator.

Figure 3B:
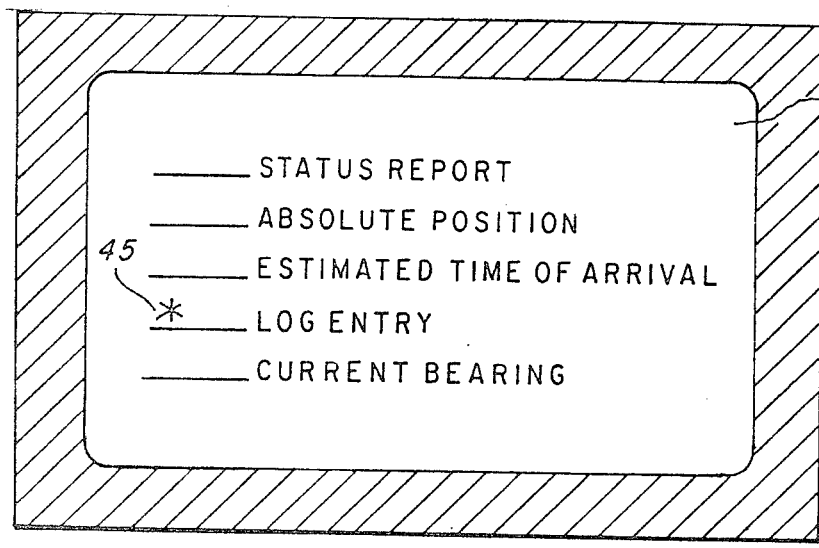
FIG. 3b is an illustration of a menu available for the operator selection.

FIGS. 3a and 3b illustrate the preferred embodiment of the operator interface and CRT illustrations.

The keyboard 41 contains the numeric keys necessary for entry of particular data for the operation. Additional keys such as 42, 43 and 44 allow the operator to move through the menu of commands and appropriately choose his command from the menu 46. As example, the cursor 45 may be moved either upward or sideways as indicated, respectively, by arrows 43 and 42. Once the cursor is in proper location matching the label desired, the operator presses the entry button 44, at which time the control means, not shown here, performs the function indicated.

The use of menu is particularly important since it allows the operator to have little or no computer expertise and yet interface effectively thereto. The menu 46 contains such information as request for a status report, the absolute position of the vessel, the estimated time of arrival of the vessel, a request to allow log entry, or the current bearing. There exists different menus so as to provide the operator with a full range of opportunity and alternatives.

Through the use of the numerals 41, the operator enters data either in the accounting form or, should one of the instruments or devices connected to the control means become inoperative, data relative to the defective instruments operation.

The entry of manually obtained data in lieu of instrument obtained data into the control means permits the system to continue operating even though one of its instruments is malfunctioning. This also acts as a safety feature.

Figure 4:
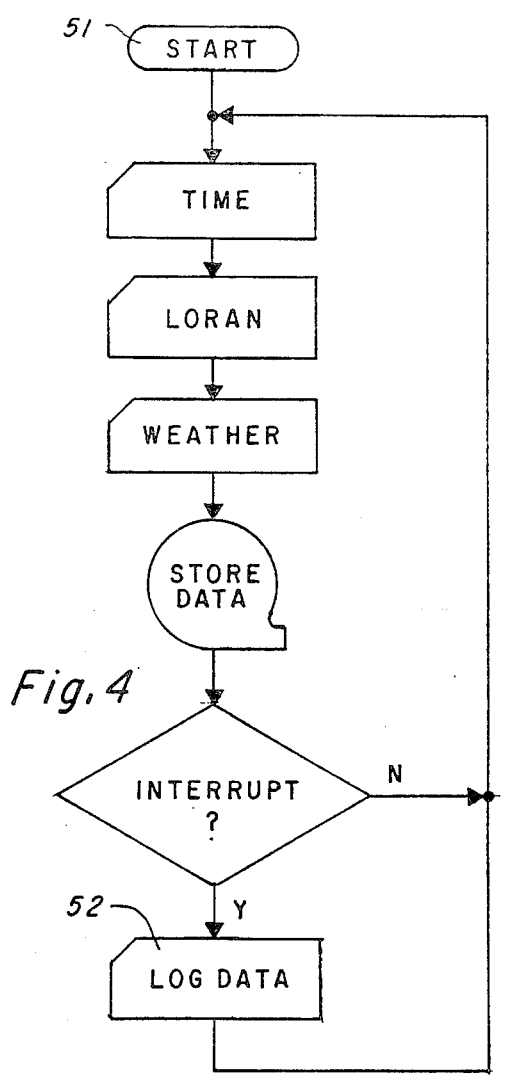
FIG. 4 is a flow chart of the automatic logging aspect of the invention.

FIG. 4 is a flow chart of the automatic operation log entry.

The automatic log is triggered at periodic times so as to make a nonvolatile record as to the position and status of the vessel. Once started 51, the automatic log characteristic of the control means determines the time the log is being entered, the absolute position of the ship, speed, and course, and stores this data on the nonvolatile memory means such as the magnetic tape cassette discussed earlier. The operator is capable of entering selected data as to specific events by use of an interupt which allows him to enter log data 52. Once the operator data 52 is appropriately entered, the device cycles back to maintain and re-enter the data.

The log operation is triggered at preset intervals such as after each watch or once a day.

In this fashion, an automatic log which is far more accurate than the human entry, is preserved for subsequent analysis or records. Although the log is made automatically, the operator is capable of entering data as well. Since the log is digital in nature, it is more readily available to analysis and transcribing once the vessel returns to home port.

FIG. 5 is a flow chart of the method of determining a dangerous condition within the vessel.

The monitoring of a dangerous condition within the vessel is particularly important so as to preserve the safety of the vessel and it's passengers. Numerous conditions may exist which will endanger the vessel or its occupants and these conditions are individually or combinationally monitored.

Once started 60, the initial condition checked is the surrounding area via the radar, so as to determine if a collision with another vessel is immenient. The radar data 61 is received and a determination as to a dangerous condition is made 62; if a dangerous condition does exist, an alarm 63 is sounded via the voice synthesizer or other bells or auditory means so as to alert the operator as to this condition and generates a log entry. A similar process of sampling the data from a sensor or device, determining if a danger exists, and sounding an appropriate alarm is repeated using the sonar device. This process is repeated for all the sensors such as weather data, fuel condition, mayday frequency monitor, or as tailored to the particular vessel 64.

This program allows the operator's time for monitoring the fuel and radar to be reduced to a minimum. This increases the operator's efficiency by relieving him of boring and time consuming tasks.

Figure 6:
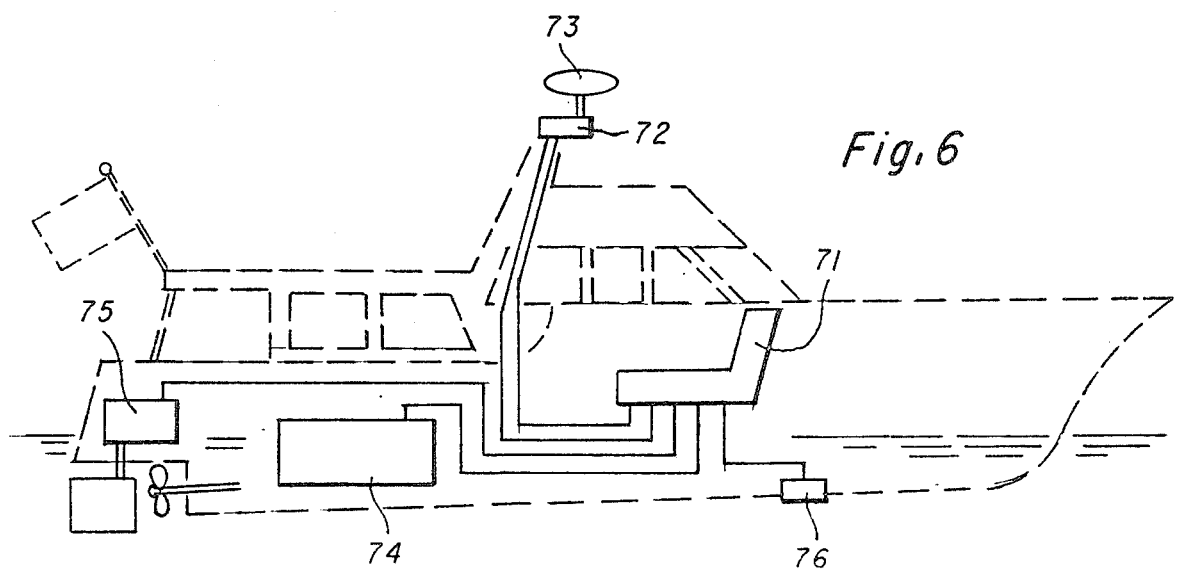
FIG. 6 is a pictorial view of the invention in a marine environment.

FIG. 6 pictorially illustrates the overall system integrated into a vessel as a single unitary system.

The center of the system 71 lies in the cockpit area of the vessel. The center 71 is comprised of the control means and operator interface. As noted earlier, the operator interface has both visual and auditory communications ability together with a keyboard so as to allow operator input.

The center 71 communicates with the remote devices and apparatus lying at various locations throughout the vessel. These remote devices and apparatus monitor conditions necessary for the efficient operation of the vessel. As example, these apparatus include radio transmission via antenna 73, the radar device 72, the sonar device 76, the autopilot 75 and the fuel level 74.

The entire vessel is therefore linked together in a single unitary integrated system which utilizes the data from all points within the vessel of concern to create a single informative communication to the operator and to monitor varying conditions throughout and without the vessel.

Figure 7A:
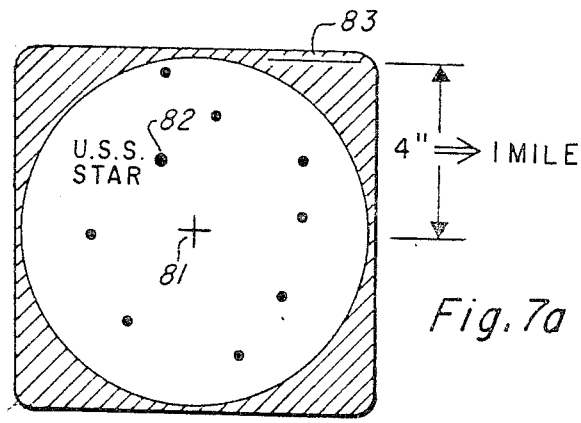
FIGS. 7a, 7b, and 7c are illustrations of the radar screen enlargement and datum point movement.
Figure 7B:
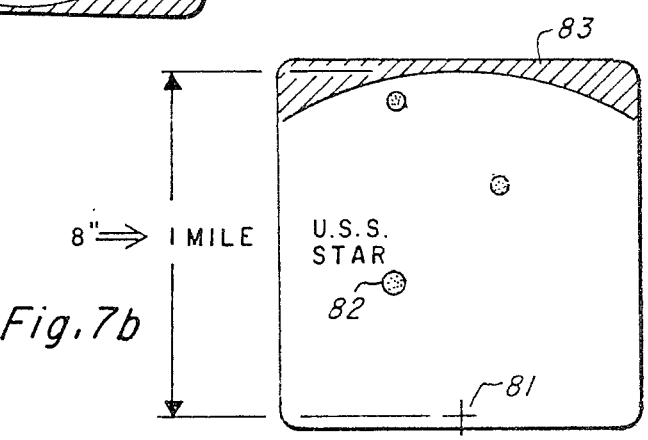
Figure 7C:
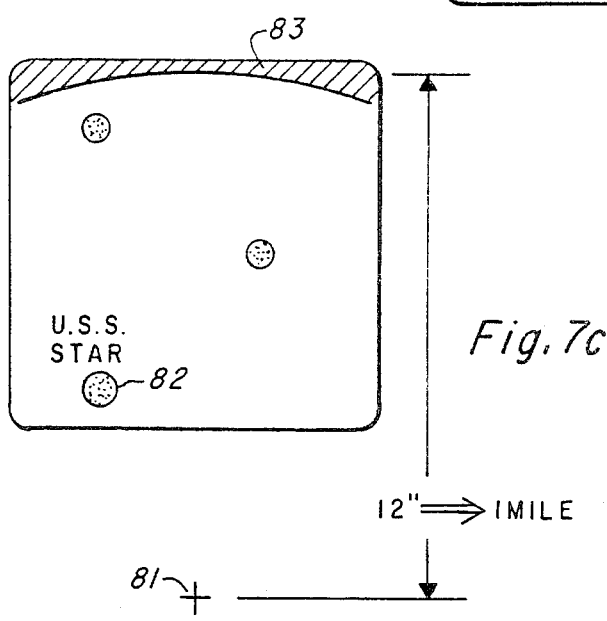

FIGS. 7a, 7b, and 7c, illustrate the advantage gained through manipulation of the center and magnification of the radar display.

In FIG. 7a the typical radar display 83 is illustrated showing a center 81 located at the geometric center of the display. In this example, the radar apparatus has a range of one mile with a display screen of four inches. This results in a four inch radii mapping as one mile. A particular blip 82 within the screen 83 has been identified by the operator as a sister ship, the U.S.S. Star. By labeling a particular blip, the control means is able to monitor its movement and to keep track of its operation with respect to its carrier vessel. The tracking of other identifiable ships is of particular importance when the vessels are traveling in convoy fashion.

FIG. 7b illustrates the situation where the datum or center 81 has been moved to the bottom of the screen; thereby permitting the entire screen to represent the forward section or forward looking part of the radar device. Hence, eight inches (the entire screen) is now equivalent to one mile. The display of FIG. 7b has twice the resolution as FIG. 7a since the screen has been effectively doubled in size.

The movement of the window or view of the radar display allows the operator to, at will, improve the resolution of a particular area of concern. The manipulation of the digital radar data is accomplished via the control means.

In FIG. 7c the datum or center 81 has been moved completely off the effectively sighted area so as to improve the resolution even more; hence, 12 inches is equivalent to one mile so as to have three times the resolution of the windowed as FIG. 7a.

By moving the datum 81 to any particulate point, on or off the screen, the operator is able to, at his will to selectively heighten or improve the resolution of a zone of interest. This zone of interest may be either forward looking, backward looking, any side, or any angle. In the case shown, the absolute position of the U.S.S. Star 82 is heightened in FIGS. 7b and 7c to allow the operator to known and gather more information as to its status relative to other blips appearing on the radar. The radar's amount of information which is communicated to the operator is thereby enhanced significantly.

It should be noted that even though the screen has been moved to a N.W. location, the control means still receives data from the the radar echors of objects not shown on the screen. This permits the control means to monitor the radar range for dangerous conditions which would not appear on the screen.

Figure 8:
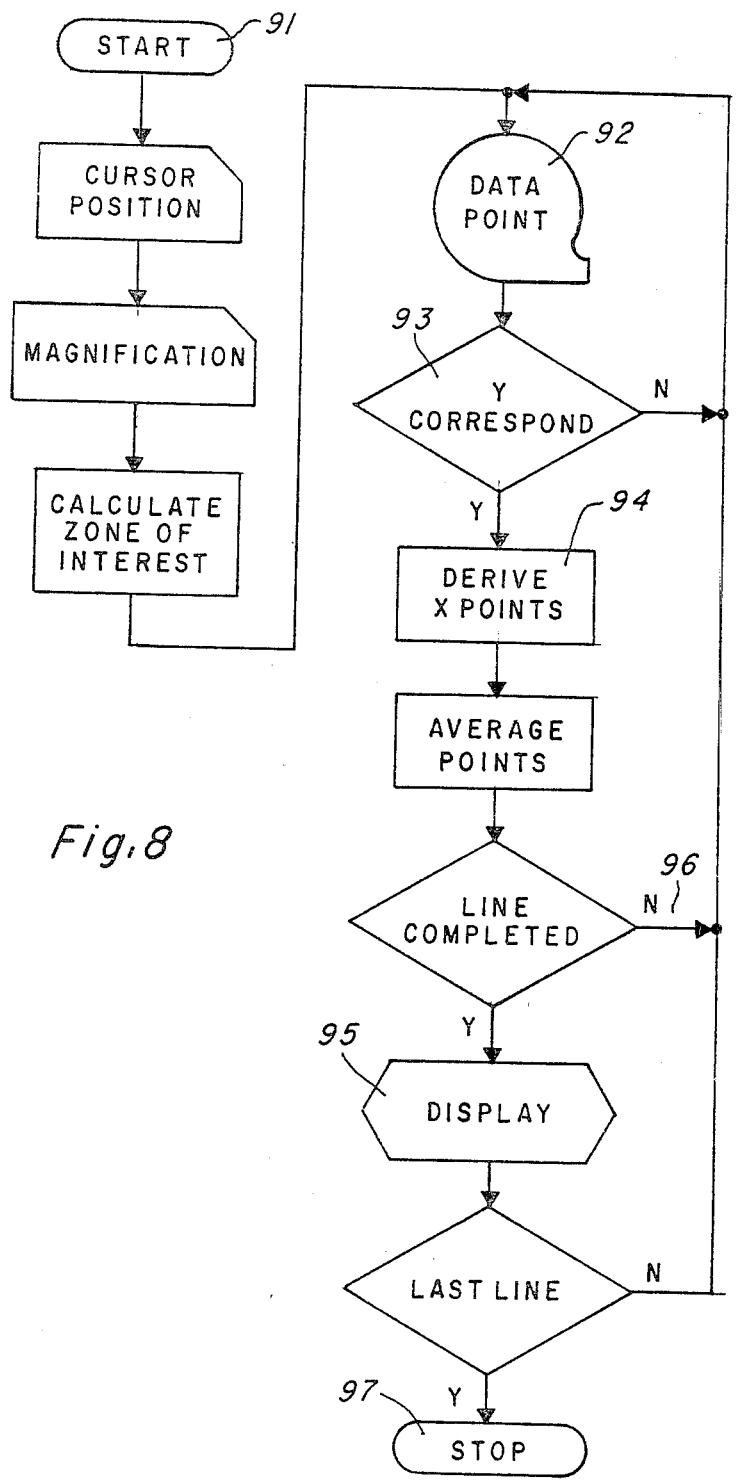
FIG. 8 is a flow chart of the preferred magnification process used in the electronic chart.

FIG. 8 is a flow chart of the preferred embodiment which magnifies so as to heighten the resolution of the electronic chart.

Once the program is started 91, the position of the cursor within the screen indicating the left most corner of the display map is determined and the selected magnification is determined. The selected magnification is entered via the keyboard or in a default situation, a preselected value is used.

Using the cursor position, the selected magnification, and the area of the display, the zone of interest is determined and the appropriate data points are utilized from the magnetic tape 92. Each data point is determined if one of its coefficients relates to the area or zone of interest 93. If the appropriate index is found, the secondary indexes are derived therefrom 94; otherwise a new data point is analyzed. In this embodiment the points are averaged to produce the appropriate resolution. In another embodiment, not shown, the line may be skipped so as to obtain the appropriate resolution.

Once the line is completed, the chart line is displayed as to the operator and the operation flips back to obtain the next line. Similarly, if the line is not complete 96, a new data point is determined. Once the last line is obtained the operation stops 97.

In this fashion, the operator enters the selected magnification as an absolute number via the keyboard and moves the cursor to the location of the chart in which he has an interest. This entered data is combined with the data in the storage means, preferably a magnetic tape cassette; the control means uses the combination in its magnification and subsequent display of electronic chart.

FIG. 9 illustrates the inner-play between the various components of the invention in the execution and delivery of the electronic chart.

The control means 10 accepts the operator input via the keyboard 17 as to the magnification and also data relative to the position of the cursor which is loop communicated back to the operator via the CRT 18. The control means utilizes a RAM or other working memory 101 in its manipulation of this data to obtain the area of interest within the electronic chart.

The digital data base, 102, as illustrated a magnetic tape cassette, supplies the map data to the control means. The chart data is manipulated as to the magnification and the cursor position so that the desired chart is communicated back to the operator via the CRT 18. Through the use of a Loran-C 11 or other position determining means, the control means additionally plots the absolute position of the vessel on the electronic chart which is displayed on CRT 18.

This illustrates the cross matching between a dynamic condition, the Loran-C data, and the static condition, an electronic chart. This cross matching communicates, to the operator, in a single glance what normally takes mental correlation and manipulation on a paper chart by the operator; this significantly reduces the operator effort, so as to relieve him to perform other tasks.

FIGS. 10a and 10b, illustrate pictorially, an electronic chart and its magnification enhancements.

In FIG. 10a, the electronic chart of a land mass and shore line is illustrated of the Houston area. The additional information 110, illustrated, relates to the time 112, the longitude 113, the latitude 114, and the speed 115, of the vessel.

Numerous charts may be stored on a single cassette so as to define the entire trip or course of the vessel from the start to finish. The physical storage requirements of a magnetic tape cassette are minimal so as to allow a library of charts to be carried easily on the vessel. By inserting a new cassette, the operator has a fresh choice of charts to view.

As the operator nears the harbor of Galveston, he moves the cursor into the area as indicated by the cursor 111 and magnifies the original chart to highlight that particular area. This is illustrated in FIG. 10b. The cursor 111 is in the left most position, which, together with the selected magnification illustrates the Galveston harbor. Again, additional information 220 is communicated to the operator on the side of the screen. The resolution of FIG. 10b is much greater than the resolution of FIG. 10a so as to permit the operator to determine more accurately the necessary course and conduct.

The magnification of a particular area on the electronic chart is not dependent on the absolute position of the vessel but may be any area within the electronic chart.

Figure 11:
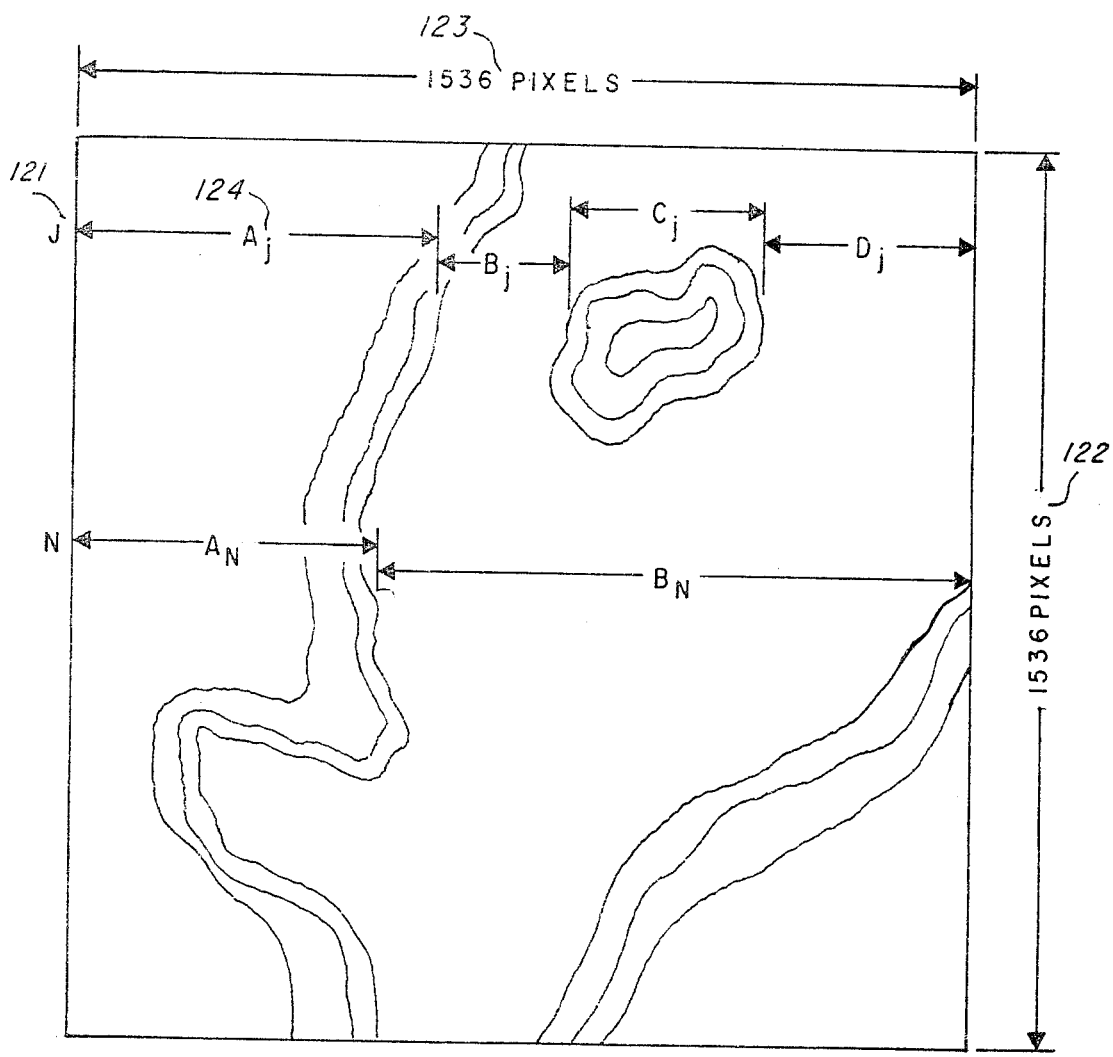
FIG. 11 illustrates the scan level method of encoding a digital map.

FIG. 11 illustrates the preferred encoding scheme for the electronic chart so as to reduce the actual number of bits necessary for storage and thereby allow the efficient storage of data.

The chart of FIG. 11 is divided into 1,536 columns 122 and 1,536 rows 123. Either the columns or the rows or a diagonal thereof may be taken to form parallel scan lines 121 which are encoded to define the electronic chart. Each scan line consists of variable runs, such as $A_j$ 124, As example, scan line j 121, consists of four runs. Each run is of a finite length; the sum of the runs within a scan line must equal 1,536, the length of the scan line. In the encoding scheme a particular scan line having K number of runs will need only K−1 numbers to totally define the length of all the runs. The end run must have a length which is the complement of the summation of the other runs from 1,536.

FIGS. 12a and 12b illustrate the preferred encoding of the electronic chart of FIG. 11 which is put on the magnetic tape.

As noted before, each scan line consists of a particular number of runs defined by N 131. The first run of the scan line is land or water and is indicated so by the land/water indicator 132, a single bit. As example, a "0" indicates water while a "1" indicates land. Thereafter, a number 133 defines the length of the first run. The length of the next N−1 runs is stored on the magnetic tape in this fashion.

This sequence of scan line determination of the run numbers, land/water indicator and runs is continued for the entire chart. An End-Of-Tape 134 is added to the magnetic tape to indicate that the entire digital chart has been defined.

The length of a run such as encoded in 133, is of variable length so as to permit extension of the field to encompass the worse case situation. This variable length is illustrated in FIG. 12b. In this embodiment, the run bit length consists of a first indicator bit 135 which determines the length of the following field. As example, assume that the indicator bit 135 is set to one, thereafter, the next 11 bits, 136 and 137 will be used to define the length of the run. Should though, the indicator bit 135 be not set, that is "0", then only the next seven bits 136 are used to actually determine the length of the run.

In this fashion, the digital chart is encoded so as to require a minimum space. This takes maximum advantage of the magnetic tape.

Figure 13:
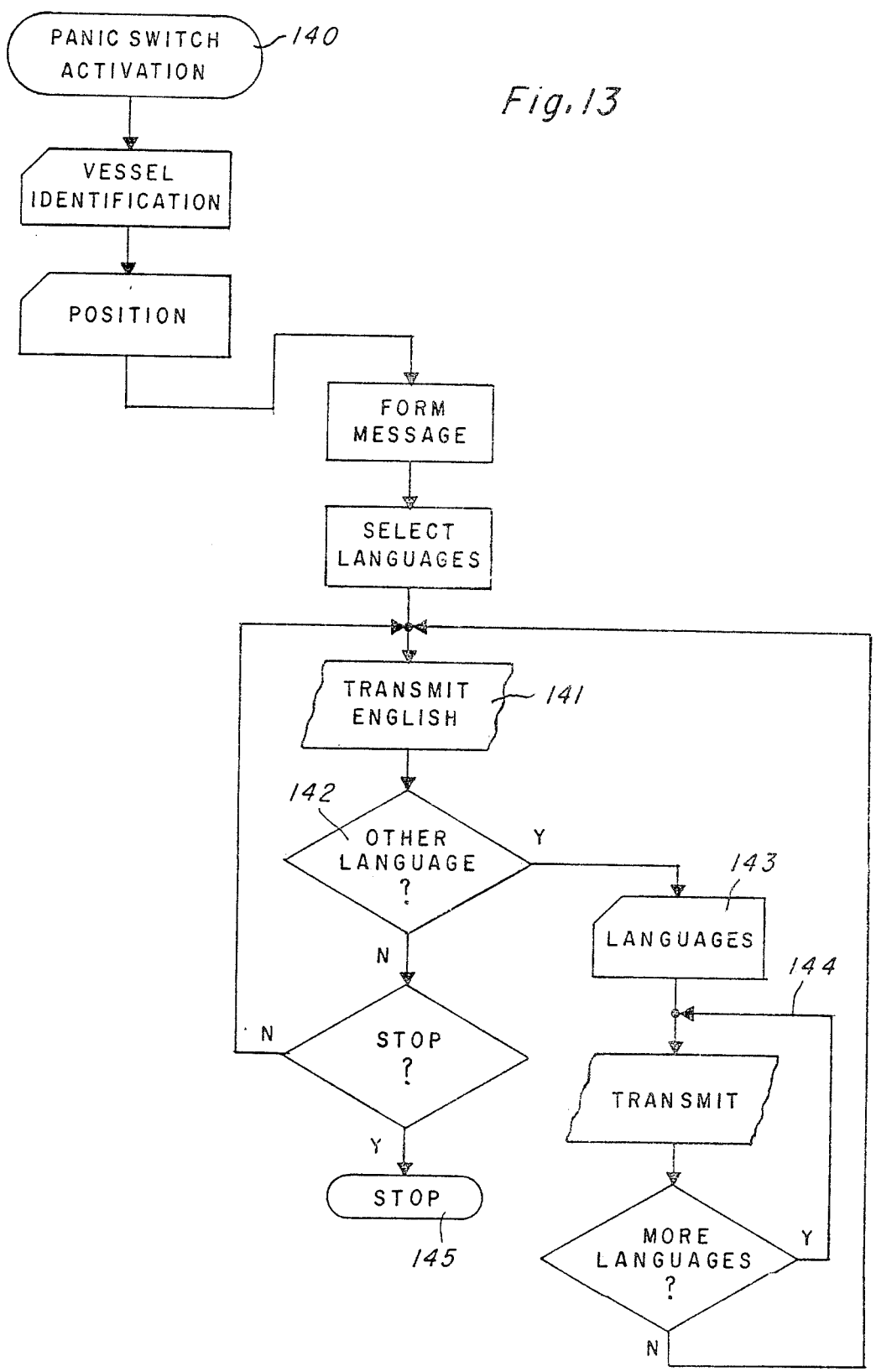
FIG. 13 is a flow chart of the automatic distress signal generator.

FIG. 13 is a flow chart of the automatic distress call.

Once the panic switch is activated 140 either by human entry or by a sensor activation, the vessel I.D. is obtained from a data bank, the position is determined by the Loran-C receiver or other position determining means, and a message is formed incorporating these two sets of data.

The message or "Mayday" message, which is composed of words or phrases obtained by selecting particular addresses for corresponding words and phrases in the voice synthesizer which addresses are then sequentially placed in storage and utilized as the "Mayday" message, is originally transmitted in English 141 or another chosen langauge. In this illustration, the original transmission is in English. A determination 142 is made if other languages should be used and if so these langauges are obtained and transmitted 143. Multiple languages may be used and transmitted through a loop back relationship 144. The process continues transmitting the mayday message until the operation is either stopped manually 145 or the device fails.

As is clear from the foregoing, in this invention, an integrated system in which the data is combined into a single communicative message to the operator is created permitting the previously independent systems to be correlated automatically without human intervention and thus relieve the operator of the time consuming operation of monitoring independent dials, switches, and other displays together with the need to correlate and match these independent data sets one to another. The system creates a much more efficient operator since boredom is reduced to a minimum; since the tedious and monotonous tasks are similarly reduced. Since the operator is freer to perform the human operations, a minimum of staff is necessary for the operation of the vessel.

What is claimed is:

1. A chart display system comprising:
(a) a display means for receiving run information for a preselected number of row and column scan lines for display;
(b) an attachable memory means containing a digital representation of a plurality of physical elements of a chart, said digital representation including for each scan line a plurality of binary coded words including a word for selectively indicating one of the said plurality of physical elements, a word for indicating the number of runs in said scan line, a plurality of words for indicating, for all but the last run, the length of the runs for the physical elements, each one of said plurality of words for indicating the length of the runs is of variable length having an indicator bit for selectively indicating a first or a second predetermined number of bits as a run length, and
(c) a control means operatively connected to the attachable memory means and display means, respectively, for receiving the run information thereof and converting the run information to electrical representations for display.

2. The chart system according to claim 1, further comprised of position determining means generating positional data and wherein said control means is operatively connected to the position determining means for displaying said positional data relative to said chart on said display.

3. The chart display system according to claim 2, wherein said display means for displaying includes means for magnifying said chart on said volatile display.

4. The chart display system according to claim 2, wherein said position determining means includes a Loran-C receiver.

5. The chart display system according to claim 4, wherein said display includes a cathode ray tube.

6. The chart display system according to claim 5, wherein said attachable memory means includes a magnetic tape device.

7. The chart display system according to claim 6, wherein said magnetic tape device includes a cassette tape.

8. The chart display system according to claim 5, wherein said attachable memory means includes bubble memory means.

* * * * *